(12) United States Patent
Akiyama et al.

(10) Patent No.: US 8,782,189 B2
(45) Date of Patent: Jul. 15, 2014

(54) DYNAMIC SERVICE LEVEL AGREEMENT FOR CLOUD COMPUTING SERVICES

(75) Inventors: Kazuhito Akiyama, Kanawaga (JP); Kazuo Iwano, Tokyo (JP); Akira Ohkado, Kanawaga (JP); Tadashi Tsumura, Kanawaga (JP)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 12/951,865

(22) Filed: Nov. 22, 2010

(65) Prior Publication Data
US 2011/0131309 A1 Jun. 2, 2011

(30) Foreign Application Priority Data
Nov. 30, 2009 (JP) ................................. 2009-272584

(51) Int. Cl.
*G06F 15/173* (2006.01)
(52) U.S. Cl.
USPC ........... 709/223; 709/224; 709/226; 709/238; 718/104; 718/105
(58) Field of Classification Search
USPC .......... 709/220–225, 226, 238; 718/101, 104, 718/105
See application file for complete search history.

(56) References Cited

U.S. PATENT DOCUMENTS

| 6,816,905 | B1 * | 11/2004 | Sheets et al. ................... 709/226 |
| 8,041,616 | B2 * | 10/2011 | Cullen et al. ..................... 705/35 |
| 2005/0102398 | A1 * | 5/2005 | Zhang et al. ................... 709/225 |
| 2005/0138170 | A1 * | 6/2005 | Cherkasova et al. ........... 709/225 |
| 2005/0165925 | A1 * | 7/2005 | Dan et al. ........................ 709/224 |
| 2005/0256946 | A1 * | 11/2005 | Childress et al. .............. 709/223 |
| 2006/0080656 | A1 * | 4/2006 | Cain et al. ....................... 717/174 |
| 2008/0112429 | A1 * | 5/2008 | McKinnon et al. ............ 370/442 |
| 2008/0270313 | A1 * | 10/2008 | Cullen et al. .................... 705/80 |
| 2009/0010264 | A1 * | 1/2009 | Zhang ....................... 370/395.21 |

(Continued)

FOREIGN PATENT DOCUMENTS

| JP | 2003-124976 A | 4/2003 |
| JP | 2007-249470 A | 9/2007 |

(Continued)

OTHER PUBLICATIONS

Joseph, Joshy; Cloud Computing: Patterns for High Availability,Scalability,and Computing Power With Windows Azure[online], MSDN Magazine,Japan,May 2009,[Search date Jun. 28, 2011],URL,http://msdn.microsoft.com/ja-jp/magazine/dd727504.aspx; English Abstract Only.

(Continued)

*Primary Examiner* — Ario Etienne
*Assistant Examiner* — Kidest Mendaye
(74) *Attorney, Agent, or Firm* — Steven L. Nichols; Van Cott, Bagley, Cornwall & McCarthy P.C.

(57) ABSTRACT

A method for dynamically updating a service level agreement, performed by a cloud computing server, includes storing a preference for service selection, acquiring an actual usage level of a first service provided to a user during a predetermined time period in accordance with a first service level agreement, determining a second service level agreement different from the first service level agreement based on the actual usage level acquired during the predetermined time period, and selecting a second service that satisfies the second service level agreement.

22 Claims, 14 Drawing Sheets

(56) References Cited

U.S. PATENT DOCUMENTS

| | | | |
|---|---|---|---|
| 2010/0050172 A1* | 2/2010 | Ferris | 718/1 |
| 2010/0131324 A1* | 5/2010 | Ferris | 705/8 |
| 2010/0306379 A1* | 12/2010 | Ferris | 709/226 |
| 2010/0319004 A1* | 12/2010 | Hudson et al. | 719/313 |
| 2011/0016214 A1* | 1/2011 | Jackson | 709/226 |

FOREIGN PATENT DOCUMENTS

| | | |
|---|---|---|
| JP | 2008059023 | 3/2008 |
| JP | 2009503733 | 1/2009 |
| JP | 2009-181537 A | 8/2009 |
| JP | 2009207140 | 9/2009 |

OTHER PUBLICATIONS

NRI Data Service; A Next Generation System Operational Management Solution Offered by NRI Data Services—MSP (Management Service Provider); System Management Forum Review,Nikkei Systems Provider No. 141, Japan,Nikkei Business Publications,Inc.,Jul. 12, 2001,p. 112; English Abstract Only.

* cited by examiner

FIG. 8

| SERVICE ID | SERVICE TYPE | SERVICE CHARGE | AVAILABILITY | PERFORMANCE | MANAGEMENT COST | AVAILABLE? | $CO_2$ COST | SECURITY LEVEL | |
|---|---|---|---|---|---|---|---|---|---|
| 1 | DATA ANALYSIS | 100$/ PROCESS | 99.9% | 300,000 PROCESSES/ DAY | 3$/ DAY | NO | 1 KG/DAY | HIGH | ... |
| 2 | DATA ANALYSIS | 200$/ PROCESS | 99.99% | 900,000 PROCESSES/ DAY | 5$/ DAY | YES | 2 KG/DAY | HIGH | ... |
| 3 | DATA ANALYSIS | 300$/ PROCESS | 99.99% | 2,000,000 PROCESSES/ DAY | 15$/ DAY | YES | 3 KG/DAY | HIGH | ... |
| A1 (SECONDARY CLOUD) | DATA ANALYSIS | 200$/ PROCESS | 99.99% | 900,000 PROCESSES/ DAY | 4$/ DAY | YES | 0 KG/DAY | MIDDLE | ... |

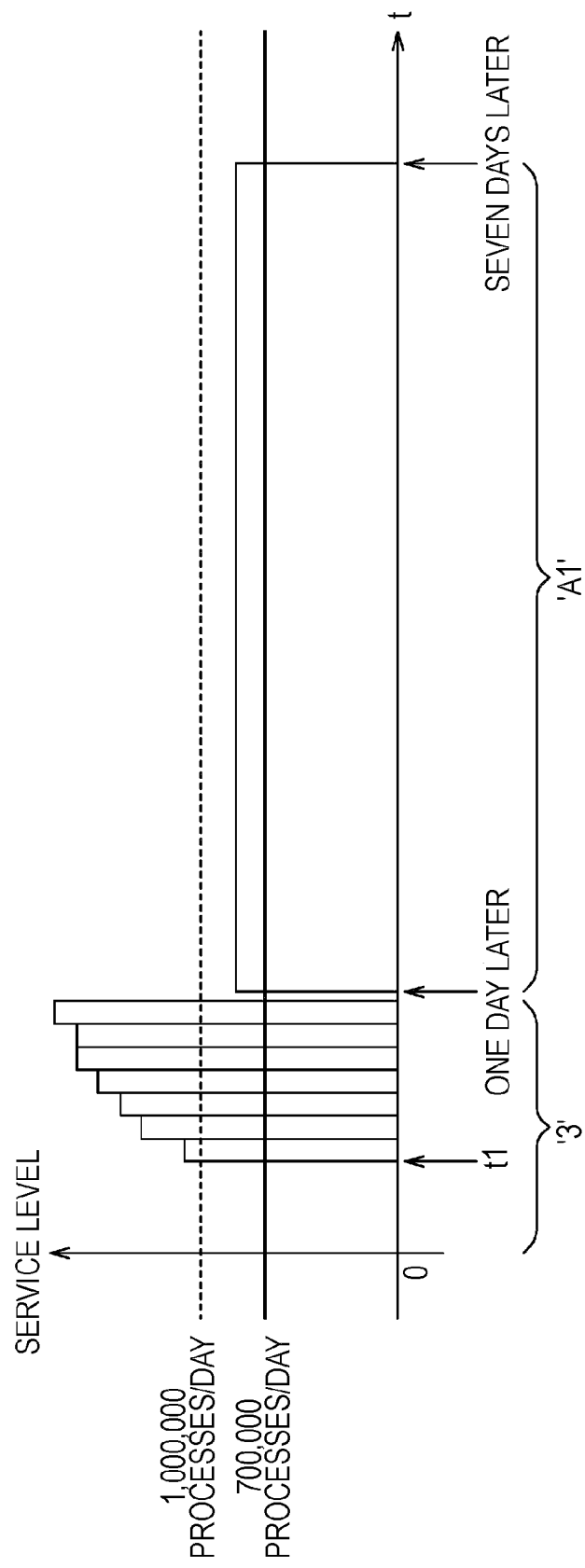

FIG. 12

(a) {
CONSTRAINTS
  SERVICE AREA  JAPAN
  AVAILABILITY > 99.9% OR AVAILABILITY OF SLA(U)
  $CO_2$ COST < 2 KG/DAY
  BACKUP = YES
}

(b) {
PREFERENCE (TARGET COST FUNCTION)
  min{($CO_2$ COST)* × 1 + (MANAGEMENT COST) * × 2 + (SERVICE CHARGE) * × 3 + ........}
}

FIG. 14

| SERVICE ID | SERVICE TYPE | SERVICE CHARGE | AVAILABILITY | PERFORMANCE | MANAGEMENT COST | AVAILABLE? | $CO_2$ COST | SECURITY LEVEL | |
|---|---|---|---|---|---|---|---|---|---|
| 1 | DATA ANALYSIS | 100$/ PROCESS | 99.9% | 300,000 PROCESSES/ DAY | 3$/ DAY | NO | 1 KG/ DAY | HIGH | ⋯ |
| 2 | DATA ANALYSIS | 200$/ PROCESS | 99.99% | 900,000 PROCESSES/ DAY | 5$/ DAY | YES | 2 KG/ DAY | HIGH | ⋯ |
| 3 | DATA ANALYSIS | 300$/ PROCESS | 99.99% | 2,000,000 PROCESSES/ DAY | 15$/ DAY | YES | 3 KG/ DAY | HIGH | ⋯ |
| A2 (SECONDARY CLOUD) | DATA ANALYSIS | 200$/ PROCESS | 99.99% | 1,000,000 PROCESSES/ DAY | 1$/ DAY | YES | 0 KG/ DAY | MIDDLE | ⋯ |

DYNAMIC SERVICE LEVEL AGREEMENT FOR CLOUD COMPUTING SERVICES

BACKGROUND

The present invention relates to cloud computing systems, and more particularly to, methods and systems capable of providing services by dynamically determining a service level agreement on the basis of the actual level of a service provided by a primary cloud computing system.

A cloud computing system is a group of autonomous computing systems connected to each other through a network such as the Internet. In such a system, the processing resources may be dynamically scalable and often virtualized. A virtual resource is a piece of software designed to emulate a piece of hardware. Using virtual resources may be one method for increasing the efficiency of a cloud computing system. Through use of a cloud computing system, details relating to the implementation of software applications running on the system and the hardware that supports them may be abstracted to the end user. Users may access computer applications through the network and have it appear as though the application is running on a local machine.

The services of a cloud computing system are typically provided by a cloud service provider. When provisioning a service on a cloud computing system, a service level agreement is typically made between the user and the cloud service provider. The user then pays for the services provided. Fees may be charged when the cloud computing system performs particular processes for the client system. However, if the primary cloud server utilizes the services of secondary cloud computing service providers, then an additional service level agreement is also made between a primary cloud service provider (hereinafter referred to as a primary cloud) and the secondary cloud service providers (hereinafter referred to as secondary clouds). To provide a service that uses a plurality of cloud computing service providers, service portability among the cloud services is required. Specifically, the primary cloud needs to select an optimum service from the secondary clouds while complying with a service level agreement with the user.

BRIEF SUMMARY

A method for dynamically updating a service level agreement, performed by a cloud computing server, includes storing a preference for service selection, acquiring an actual usage level of a first service provided to a user during a predetermined time period in accordance with a first service level agreement, determining a second service level agreement different from the first service level agreement based on the actual usage level acquired during the predetermined time period, and selecting a second service that satisfies the second service level agreement.

A cloud computing system includes a processor and a memory communicatively coupled to the processor. The processor configured to store a preference for service selection, acquire an actual usage level of a first service provided to a user during a predetermined time period in accordance with a first service level agreement, determine a second service level agreement different from the first service level agreement based on the actual usage level acquired during the predetermined time period, and select a second service that satisfies the second service level agreement.

A computer program product for dynamically updating a service level agreement for use of a cloud computing system includes a computer readable storage medium having computer readable code embodied therewith. The computer readable program code includes computer readable program code configured to store a preference for service selection, computer readable program code configured to acquire an actual usage level of a first service provided to a user during a predetermined time period in accordance with a first service level agreement, computer readable program code configured to determine a second service level agreement different from the first service level agreement based on the actual usage level acquired during the predetermined time period, and computer readable program code configured to select a second service that satisfies the second service level agreement.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 8 is a diagram showing an illustrative data structure stored in a service-list storage section of the primary cloud server, according to one example of principles described herein.

FIG. 9 is a graph showing an illustrative procedure for updating a secondary service level agreement, according to one example of principles described herein.

FIG. 12 is a diagram showing illustrative data stored in a preference-information storage section of a primary cloud server, according to one example of principles described herein.

FIG. 14 is a diagram showing an illustrative data structure stored in a service-list storage section of a primary cloud server, according to one example of principles described herein.

Throughout the drawings, identical reference numbers designate similar, but not necessarily identical, elements.

DETAILED DESCRIPTION

Figure 1:
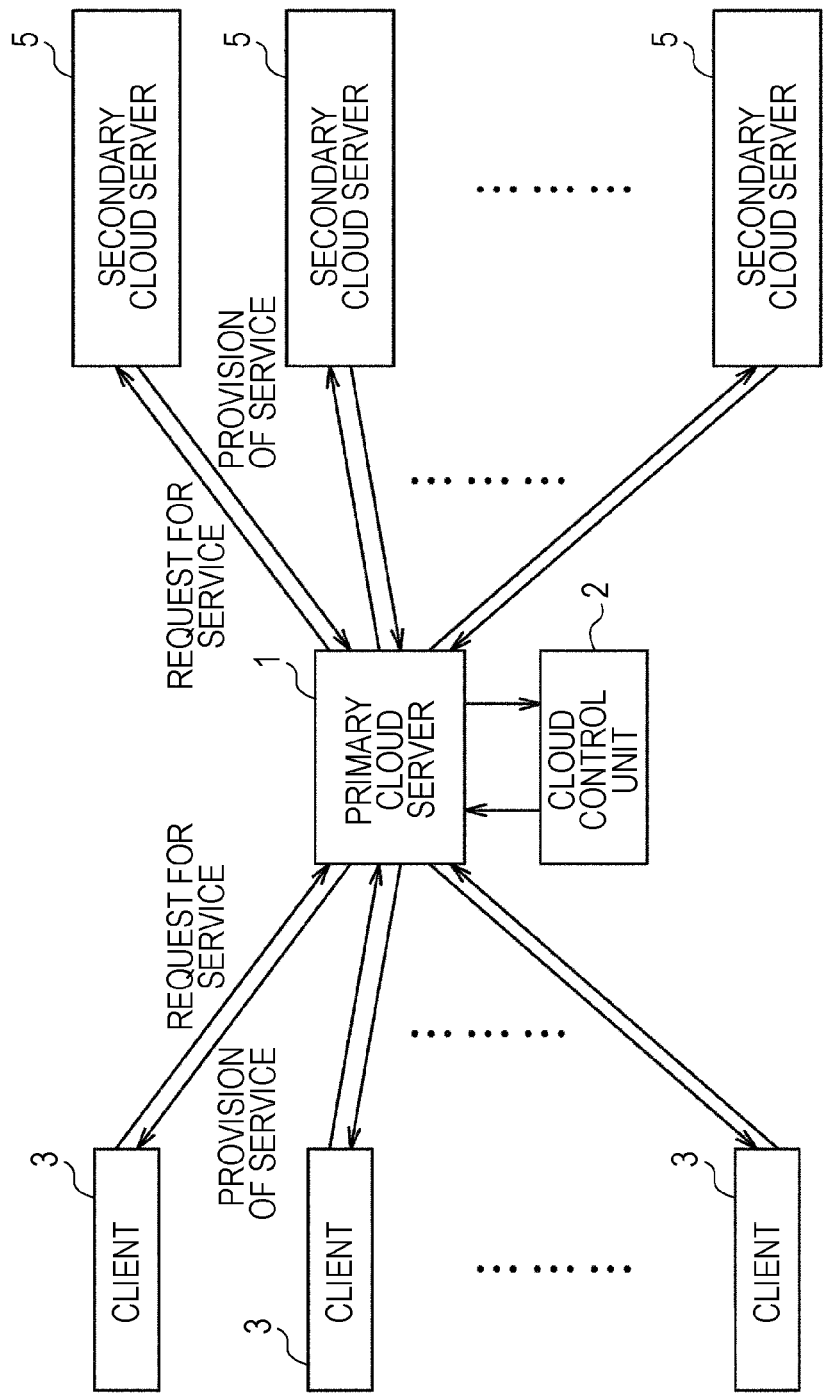
FIG. 1 is a diagram showing an illustrative cloud computing systems, according to one example of principles described herein.

As mentioned above, the primary cloud needs to select an optimum service from the secondary clouds while complying with a service level agreement between the primary cloud and the user. However, even if a change that directly influences the provision of service has occurred during the valid period (the term of the contract) of a service level agreement, only a service that is in accordance with the service level agreement can be used. If secondary clouds are used, then it is difficult to find the optimum performance when the primary cloud is limited to the original service level agreement between the user and the primary cloud. Additionally, service level agreements typically include preferences which are embodied as constraints. For example, the user may wish to only use a limited amount of processing per month to conserve power.

In light of this and other issues, the present specification teaches methods and systems for dynamically determining a service level agreement on the basis of the actual level of service provided by a primary cloud and possibly secondary clouds. According to certain illustrative examples, a cloud computing system stores a preference for service selection. Additionally, the system acquires the actual level of a first service provided to a user during a predetermined period in accordance with a first service level agreement. Then, the system determines a second service level agreement based on the actual service level acquired during the predetermined period. The system also selects a second service that satisfies the determined second service level agreement from among services provided by both a primary cloud and a secondary cloud based on the preference indicated by the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", "section", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a diagram showing an illustrative cloud computing system. The cloud computing system includes a primary cloud server (1) controlled by a cloud control unit (2). The primary cloud server (1) is communicatively connected to a plurality of clients (3) via a network. Additionally, the primary cloud is communicatively connected to a plurality of secondary cloud servers (5) that provide additional services not provided by the primary cloud server (1).

Throughout this specification, and in the appended claims, the term "primary service level agreement" will refer to a service level agreement made between the user and the primary cloud. Additionally, the term "secondary service level agreement" will refer to a service level agreement made between a primary cloud and at least one secondary cloud.

The primary cloud provides a user with a variety of services through the primary cloud server (1). These services may include Information Technology (IT) resources such as hardware and software applications. The primary cloud presents a user with these available services, along with a service level agreement. The service level agreement includes costs incurred, for example, by service charges and management fees.

In one example, the user transmits a service request selected from a client (3) to the primary cloud server (1). The service request includes the primary service level agreement. Likewise, the secondary cloud servers present the user with available services and an associated secondary service level agreement. This service level agreement also includes costs. The primary cloud then transmits a service request selected from the primary cloud server (1) to the secondary cloud servers (5). The service request includes the secondary service level agreement. The primary cloud server (1) provides the service to the user while complying with the primary service level agreement.

A service charge may include a fee for use of the provided service. For example, fees may be charged for processing using certain hardware resources, virtual resources or for use of software applications. A management fee can be charged to cover the cost of maintaining the quality of a service provided.

Figure 2:
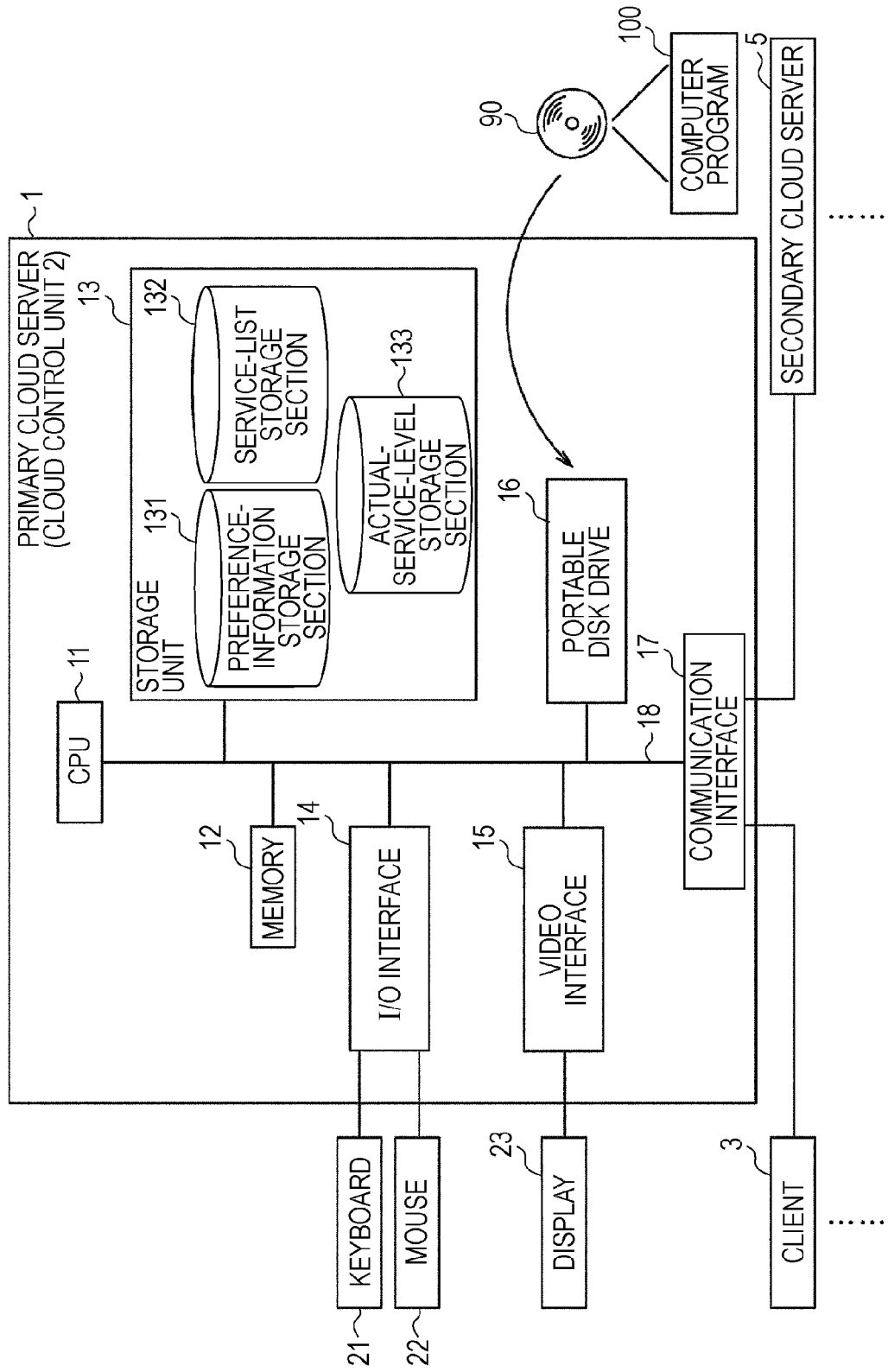
FIG. 2 is a diagram showing an illustrative primary cloud server, according to one example of principles described herein.

FIG. 2 is a diagram showing illustrative components of a primary cloud server (1) and cloud control unit (2). As shown in FIG. 2, the primary cloud server (1) includes at least a central processing unit (CPU) (11), a memory (12), a storage unit (13), an input/output interface (14), a video interface (15), a portable disk drive (16), a communication interface (17), and an internal bus (18) that connects the hardware components described above.

The CPU (11) is connected to the hardware components of the primary cloud server (1) described above via the internal bus (18). The CPU (11) controls the operations of the hardware components and executes various software functions in accordance with a computer program (100) stored in the storage unit (13). The memory (12) is a volatile memory, such as a Static Random Access Memory (SRAM) or Dynamic Random Access Memory (DRAM). A load section can be used to temporarily store data from a non-volatile memory to a volatile memory before execution of the computer program (100).

The storage unit (13) is an internal fixed storage unit, (hard disk), a ROM, or the like. The computer program (100) stored in the storage unit (13) is downloaded from a portable recording medium (90), such as a Digital Video Disc (DVD) or a Compact Disc (CD). Additionally, a computer program can be downloaded from an external computer connected via the communication interface (17).

The storage unit (13) includes a preference-information storage section (131), a service-list storage section (132), and an actual-service-level storage section (133). The preference-information storage section (131) stores preference information including constraints on the respective items of the primary service level agreement and a preference for service selection for providing a service to the user.

Examples of constraints on the respective items of the primary service level agreement may include that the mean value of characteristic values during a predetermined month or day is smaller than or equal to a fixed value, that the given characteristic value during the most recent predetermined period is smaller than or equal to a fixed value, and that a predetermined calculating process should be completed by a scheduled completion time. Information indicating the indices of the availability of provision of service, performance, the throughput of the operation of the CPU, etc. is stored as constraints, because such information changes depending on the state of provision of service. Examples of a priority for service selection include information indicating a criterion for service selection, such as the lowest service charge and the highest throughput, and may be defined by a plurality of constraints or cost functions.

The service-list storage section (132) stores a service list that includes information for identifying available services in association with respective service levels. The actual-service-level storage section (133) stores the actual level of service provided, as will be described later. The communication interface (17) is connected to the internal bus (18) to allow data communications between the clients 3 and the secondary cloud servers 5 via an external network, such as the Internet, or a Large Area Network. The input/output interface (14) is connected to data input media, such as a keyboard (21) and a mouse (22). The video interface (15) is connected to a display (23), such as a computer monitor.

Figure 3:
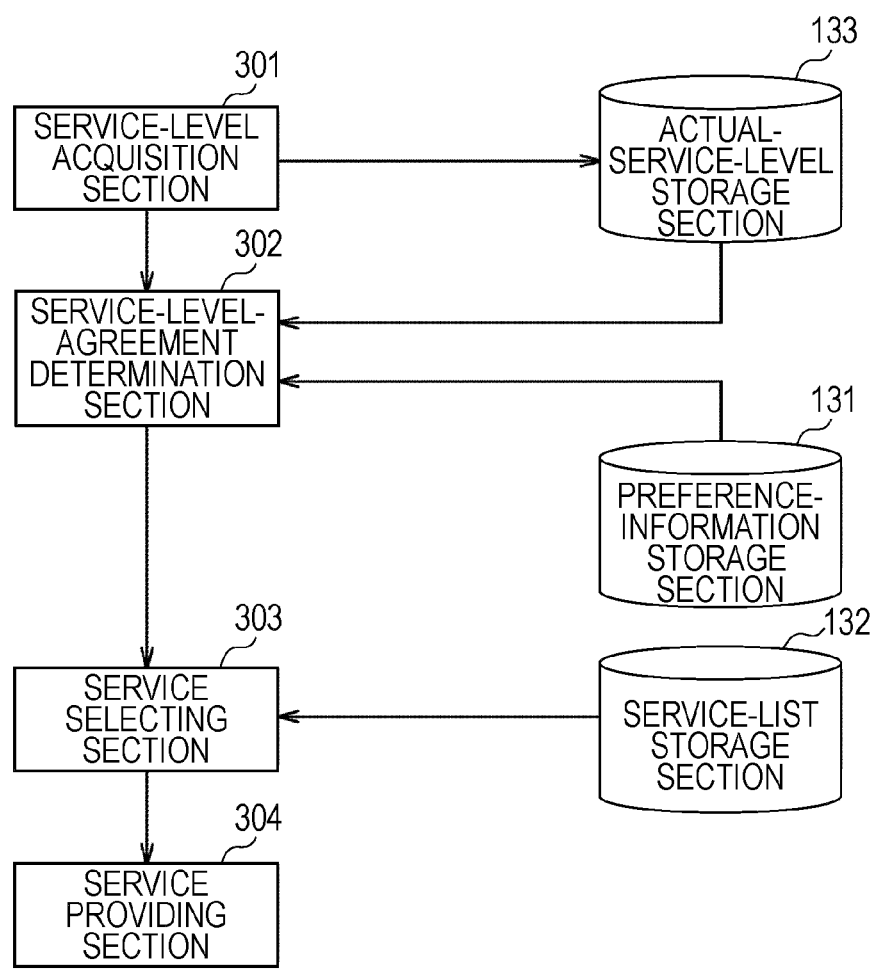
FIG. 3 is a functional block diagram of the primary cloud server, according to one example of principles described herein.

FIG. 3 is a functional block diagram of the primary cloud server (1). According to certain illustrative embodiments, a service-level acquisition section (301) acquires the actual level of service provided by the primary cloud server. This actual level of service is stored as history data in the actual-service-level storage section (133). For example, the service-level acquisition section (301) acquires and stores actual service levels at predetermined sampling intervals from the time when provision of the service is started.

A service-level-agreement determination section (302) determines a second secondary service level agreement which the primary cloud should conclude separately on the basis of the actual service level acquired. More specifically, the service-level-agreement determination section (302) updates the secondary service level agreement on the basis of the ratio of the actual service level in a predetermined period to a planned service level in that predetermined period. The planned service level for the predetermined period is stored as a set of constraints on the respective items of the primary service level agreement in the preference-information storage section (131).

Figure 4:
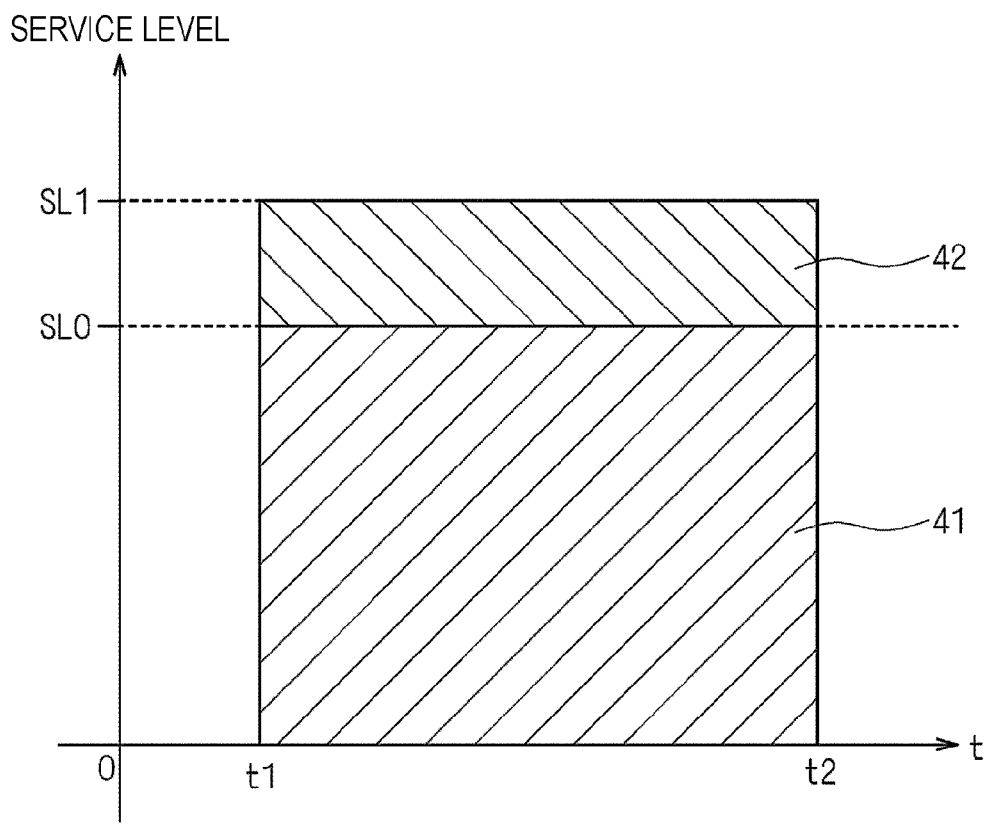
FIG. 4 is a graph showing illustrative service levels, according to one example of principles described herein.

FIG. 4 is a graph illustrating the concept of a service level agreement in a conventional primary cloud server. According to certain illustrative embodiments, when the primary service level agreement is made at a particular service level (SL0), the user expects provision of services in a service area (41) from time t1, at which provision of service is started, to time t2, at which it is determined whether the service level agreement is appropriate. However, if the actual service level is SL1, which is higher than the planned service level SL0, then excessive service corresponding to a service area (42) is provided. However, the user expects only the service corresponding to the primary service level agreement, which correspond to service area 41. Thus, the primary cloud incurs costs which are not able to be charged to the user.

Figure 5:
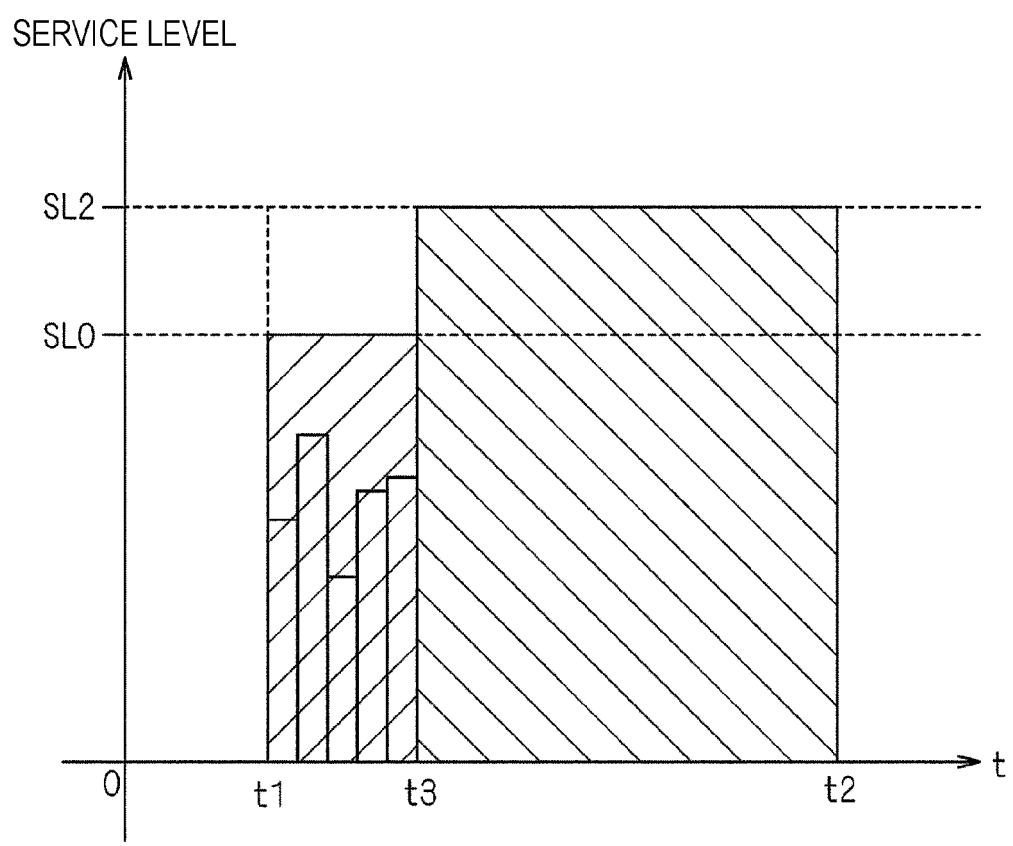
FIG. 5 is a graph showing illustrative service levels, according to one example of principles described herein.
Figure 6:
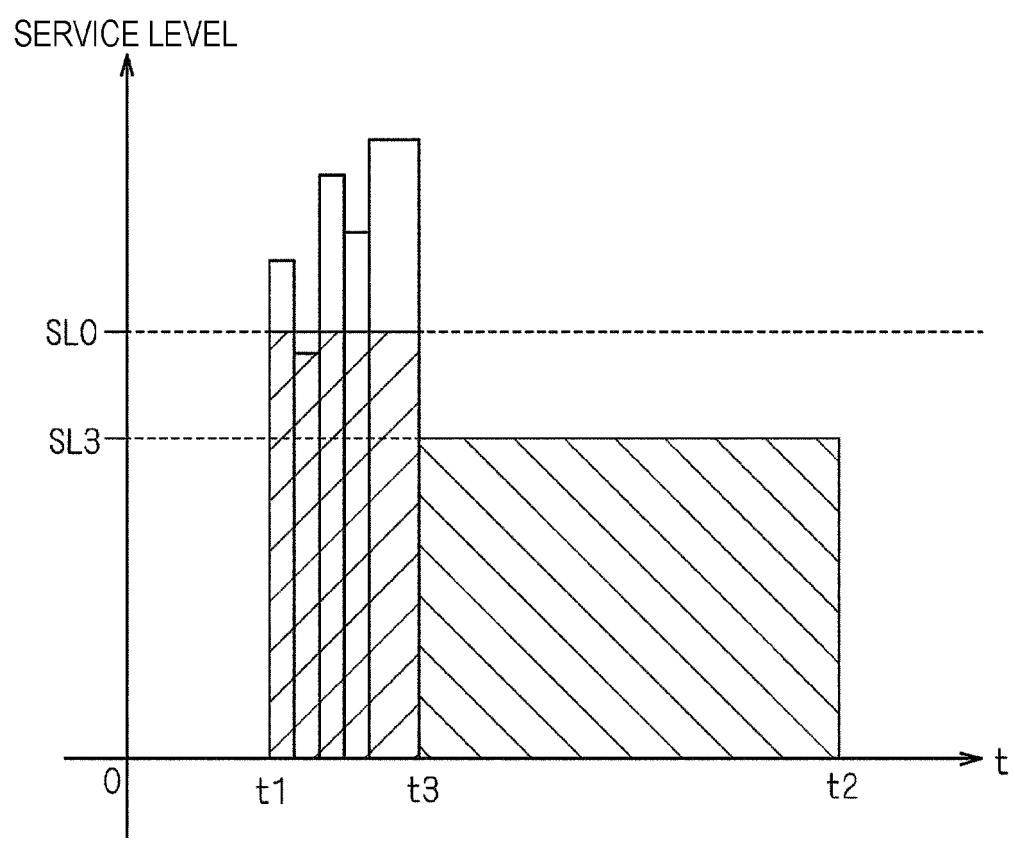
FIG. 6 is a graph showing illustrative service levels, according to one example of principles described herein.

FIGS. 5 and 6 are graphs that schematically illustrate the concept of service-level agreement control of the primary cloud server (1). FIG. 5 illustrates the case where the level of service provided is actually lower than the planned value. In FIG. 5, the user is under the primary service level agreement at a service level SL0 from time t1 until time t2, at which time it is determined whether the second secondary service level agreement is appropriate. However, at time t3 before time t2, the actual level of service that is provided by that time in the contract term is lower than the planed service level SL0. Thus, it can be determined that the level of service at the end of the contract term will be less than that of the first primary service level agreement.

In this case, the cloud control unit that controls the operation of the primary cloud server updates the secondary service level agreement to a level higher than the primary service level agreement. In other words, the cloud control unit can improve the service level so as to provide service at a planned service level at the end of the contract term by updating the secondary service level agreement with a higher level on the basis of the ratio of the actual service level to the planned service level during the predetermined period.

FIG. 6 illustrates the case where the level of service provided is actually higher than the planned value. In FIG. 6, the user is under the primary service level agreement at a service level SL0 from time t1 until time t2, at which it is determined whether the secondary service level agreement is appropriate. However, at time t3 before time t2, the level of service that is actually provided by that time during the contract term is higher than the planned service level SL0. Thus, it can be determined that provision of service until the end of the contract term will be larger than that by the primary service level agreement.

Thus, the cloud control unit that controls the primary cloud server updates the secondary service level agreement to a level higher than the primary service level agreement. In other words, the cloud control unit can change the service level to SL3 by updating the secondary service level agreement with a lower level on the basis of the ratio between the actual service level to the planned service level during the predetermined period between t1 and t3.

The timing for which the service-level-agreement determination section (302) updates the secondary service level agreement is not limited to regular time intervals. The timing is not particularly limited and may be, for example, the time for which an event from an external monitor system is received. Additionally, the time at which the service-level-agreement determination section (302) updates the secondary service level agreement may be at a scheduled time.

The time when the secondary service level agreement is updated is not limited to the examples in FIGS. 5 and 6. For example, if the secondary service level agreement is updated every month, then the secondary service level agreement throughout the month may be determined on the basis of the actual level of service provided from the beginning to the end of every month. Alternatively, a secondary service level agreement up until a fixed period may be determined on the basis of the actual level of service provided from a longer fixed time before the present time. For example, the service level agreement for a six hour period may be based on the actual service level of the past twelve hours. This method is effective in determining the secondary service level agreement by a moving average method.

Referring back to FIG. 3, the service selecting section (303) selects a service that satisfies the determined secondary service level agreement from among services provided by both the primary cloud and the secondary clouds. The service selected may be on the basis of a preference for service selection in the primary service level agreement. This preference, received by a user, is stored in the preference-information storage section (131). The preference for service selection can be stored as a combination of a plurality of constraints and target cost functions. Such functions may include cost minimization functions, cost target functions, and management fee minimizations functions.

In addition, a service list that includes available information may be stored in the service-list storage section (132) in association with respective service levels. This will allow the service selecting section (303) to select services with a service level that satisfy the newly determined secondary service level agreement. Because the service list stores information on the details of service that can be provided by the secondary clouds as well as information on the details of service that can be provided by the primary cloud, the service selecting section (303) can select a plurality of available services.

The information on the details of services stored in the service list and provided by the secondary clouds may be either dynamically updated or regularly updated. The items of the service list may also include attributes necessary for defining the secondary service level agreement and target cost functions.

The selecting section (303) can also select the highest-preference service (second service) from the plurality of extracted services on the basis of a preference for service selection in the primary service level agreement. The service selected may be either a service that can be provided by the primary cloud or a service that can be provided by the secondary clouds.

A service providing section (304) provides a selected service. This service may be provided by either the primary cloud or a secondary cloud through the primary cloud. This allows the service providing section (304) to provide a service that satisfies the secondary service level agreement that is updated on the basis of the level of an actually provided service while maintaining a service level required in the primary service level agreement.

Figure 7:
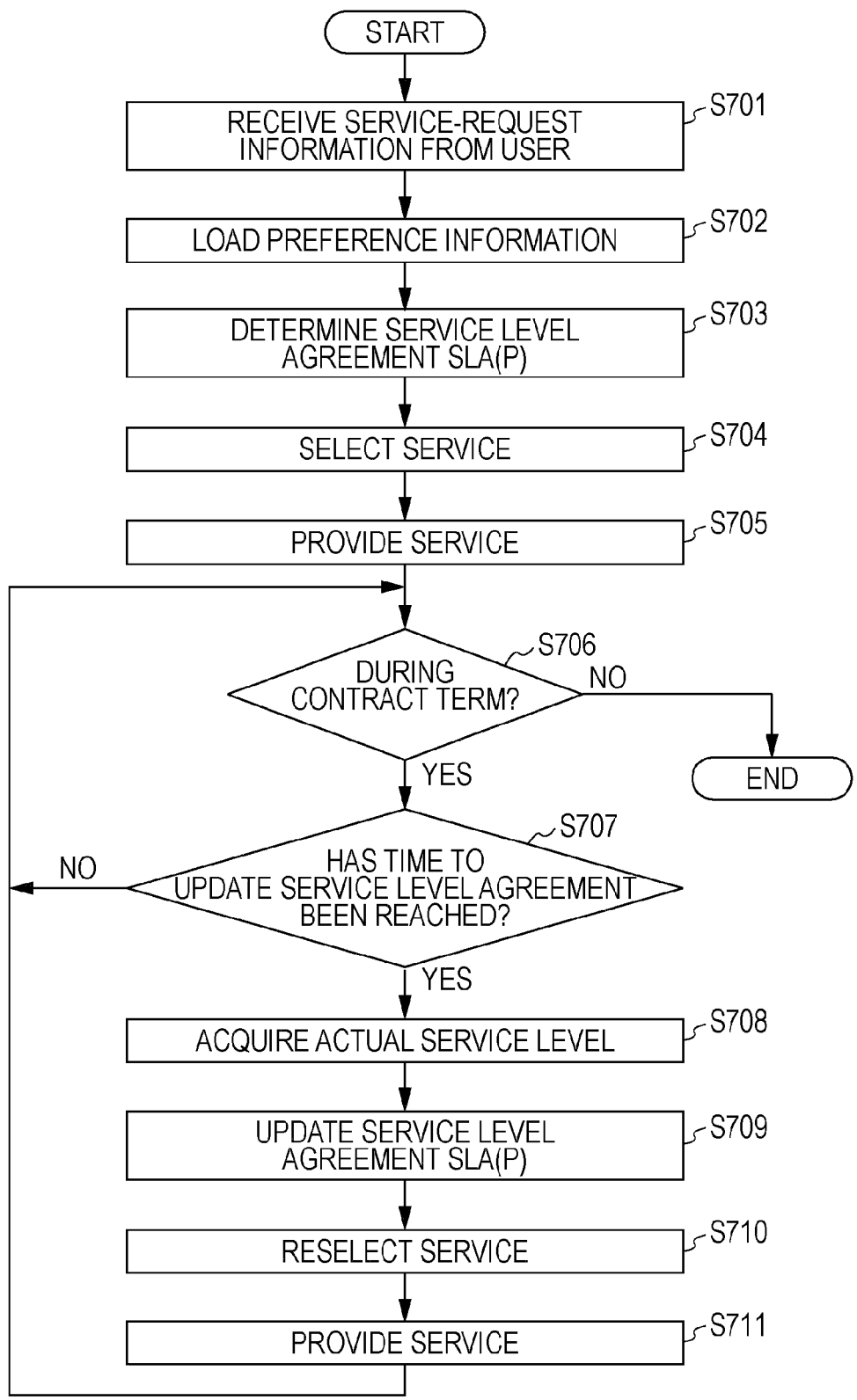
FIG. 7 is a flowchart showing an illustrative procedure performed by the Central Processing Unit (CPU) of a primary cloud, according to one example of principles described herein.

FIG. 7 is a flowchart showing an illustrative process performed by the CPU of a primary cloud server. According to certain illustrative embodiments, the CPU receives (step S701) service-request information from the user client (e.g. 3, FIG. 1). Specifically, the CPU receives service-request information that includes information on the details of the primary service level agreement that is to be made between the user and the primary cloud. For example, the CPU can receive service request information entitled "data analysis." This information may apply to a specific period of service such as from Apr. 1, 2008 to Aug. 31, 2009. The information may indicate that the service includes up to 7,000,000 processes per week.

The CPU loads (step S702) preference information stored in the preference-information storage section and determines (step S703) a secondary service level agreement separately from the primary service level agreement. The CPU determines the secondary service level agreement by merging constraints on the respective items of the primary service level agreement received as the service-request information with the loaded preference information.

For example, if constraints on the items of the primary service level agreement, stored as preference information in the preference-information storage section are security placed at middle level or higher, and service selection at "minimum" management cost, then the CPU merges the primary service level agreement included in the service-request information and the constraints on the items of the primary service level agreement included in the preference information together to determine a new secondary service level agreement in which performance is 7,000,000 processes per week, and security is "middle level or higher."

The CPU then selects (step S704) a service that satisfies the determined secondary service level agreement and provides (step S705) the service. This allows a service based on the stored preference information to be provided.

FIG. 8 is a diagram showing an illustrative data structure stored in the service-list storage section of the primary cloud server. According to certain illustrative embodiments, the service-list storage section stores a list of information necessary for selecting service, such as the type of service, the service charge, the availability, the performance, the management cost, as well as whether the service is available, a Carbon Dioxide (CO2) cost, and a security level, in association with service IDs for identifying the service.

In this example, the secondary service level agreement is determined such that performance is 7,000,000 processes per week, availability is 99.99% or more, and security is "middle level or higher." These constraints are satisfied by Service ID 3 only, thus the CPU would select Service ID 3.

Referring back to FIG. 7, the CPU of the primary cloud server determines (step S706) whether the present period in time is during the term of the primary service level agreement made with the user. If the CPU determines (step S706, YES), that it is during the term of the contract, then the CPU determines (step S707) whether the time to update the secondary service level agreement has been reached. If the CPU determines (step S707, YES) that the time to update the secondary service level agreement has been reached, then the CPU acquires (step S708) an actual service level stored as history data in the actual-service-level storage section and updates (step S709) the secondary service level agreement. For example, in the case where an actual service level is acquired every day, the CPU updates the secondary service level agreement at the end of each week to comply with the primary service level agreement.

FIG. 9 is a graph showing an illustrative procedure for updating the secondary service level agreement. In the example of FIG. 9, the time interval between subsequent updates to the secondary service level agreement is one week. Additionally, the actual service levels are acquired once per day.

As shown in FIG. 9, the actual service levels from time t1 until one day later are acquired. In this example, 2,200,000 processes have been acquired as the actual performance of a service with a service ID 3 that is provided to the user. Since the updated secondary service level agreement specifies performance as 7,000,000 processes per week, or, 1,000,000 processes per day, the actual level shows that an excess of services as many as 1,200,000 processes per day have been provided. Moreover, since the performance shows an increasing tendency, as shown in FIG. 9, it is sufficient to execute the remaining 4,800,000 processes in the remaining six days until the secondary service level agreement is to be updated. This will entail executing 800,000 processes per day. Thus, the performance of 1,000,000 processes per day of the secondary service level agreement is updated to 700,000 processes per day. The reason that the secondary service level agreement is not updated to 800,000 processes per day is because the actual level shows the tendency to become higher than the planned level of the secondary service level agreement. An excess of about 100,000 processes per day can be determined by a proportional calculation.

Referring back to FIG. 7, the CPU of the primary cloud server reselects (step S710) a service that satisfies the updated secondary service level agreement and then provides (step S711) that service. Thus, a service based on the actual service level provided in the past can be provided.

If the CPU determines that the time to update the secondary service level agreement has not (step S707, NO) been reached, then the CPU returns the process to step S706 and repeats the processes described above. If the CPU determines that the contract term has indeed (step S706, NO) expired, then the CPU terminates the process.

Continuing the example, the updated secondary service level agreement specifies the performance as 700,000 processes per day. Additionally, the availability is set as "99.99% or more", and the security level is set to "middle level or higher." Each of these specified performances is satisfied by three services, specifically, service ID 2 and service ID 3 of the primary cloud and a service entitled service ID A1 from one of the secondary clouds. Because a service with a "minimum" management cost is given a preference for service selection, the service ID A1 of the secondary cloud is selected. If it is determined at the end of every week whether the primary service level agreement has been complied with, then the secondary service level agreement can be adjusted at any time during the contract term by updating the secondary service level agreement on the basis of the actual service level to be sure to comply with the primary service level agreement.

According to the example described above, the secondary service level agreement can be determined on the basis of the actual level of a service that is provided to the user. Additionally, a service that satisfies the newly determined secondary service level agreement can be dynamically selected and provided to the user while complying with the primary service level agreement between the primary cloud and the user.

Figure 10:
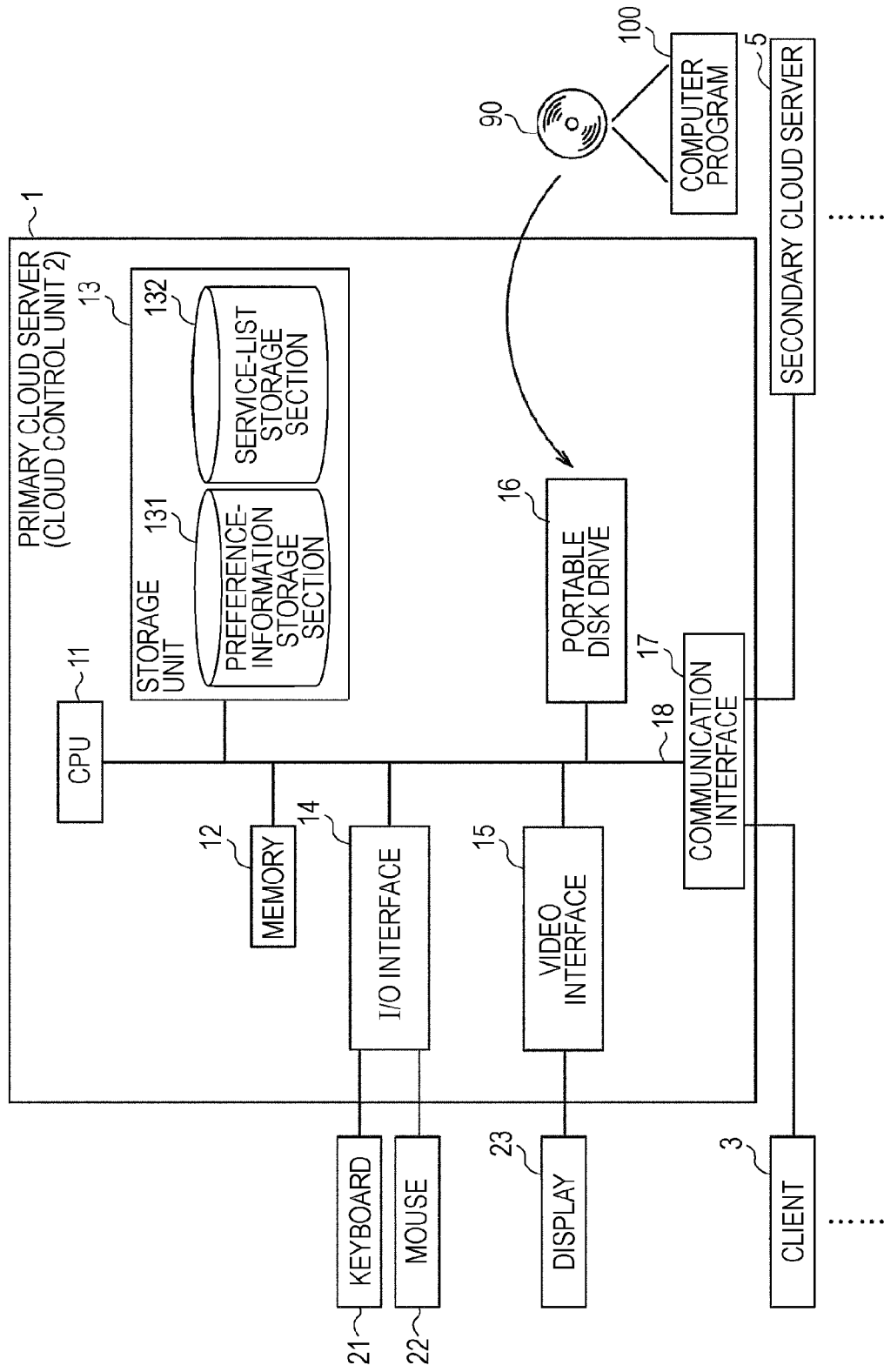
FIG. 10 is a diagram showing an illustrative primary cloud server, according to one example of principles described herein.

In a second example, the service level agreement is dynamically updated every time preference information is updated. FIG. 10 is a block diagram showing an illustrative primary cloud server. The second example is similar to the example described above. One difference is that in this example the primary cloud server (1) does not include the actual-service-level storage section (e.g. 133. FIG. 3).

Figure 11:
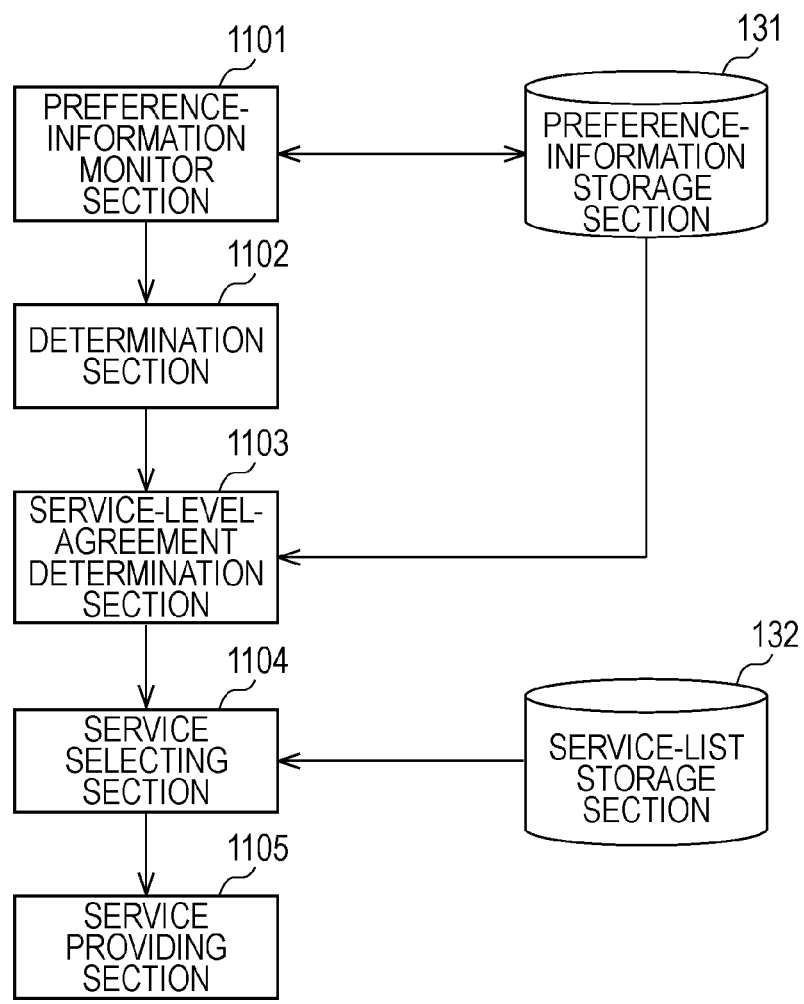
FIG. 11 is a functional diagram of a primary cloud server, according to one example of principles described herein.

FIG. 11 is a functional block diagram of the primary cloud server 1 according to the second example. In FIG. 11, a preference-information monitor section (1101) monitors constraints on the respective items of the primary service level agreement as well as a preference for service selection stored in the preference-information storage section (131). These preferences are read at every sampling time. A determination section (1102) determines whether constraints on the respective items of the primary service level agreement have been updated at every sampling time. Specifically, the determination section (1102) determines whether constraints on the respective items of the primary service level agreement, including preferences for service selection that are read at the previous sampling time, and constraints on the respective items of the primary service level agreement, including preferences read at this sampling time agree with each other.

FIG. 12 illustrates an example of data stored in the preference-information storage section (131) of the primary cloud server. FIG. 12(*a*) shows an example of constraints on the items of the primary service level agreement stored, and FIG. 12(*b*) shows an example of a preference for service selection.

As shown in FIG. 12(*a*), constraints on the items of the primary service level agreement are information on a service area, the lower limit of availability, the upper limit of a $CO_2$ cost, and whether or not the system is backed up. As shown in FIG. 12(*b*), a preference for service selection is a target cost function based on a plurality of arguments, such as a $CO_2$ cost, a management cost, and a service charge. In this case, a service with a target cost function at the minimum is selected. The arguments may either be weighted or they may be simply summed up, as shown in FIG. 12(*b*).

Referring back to FIG. 11, if the determination section (1102) determines that the preference information has been updated, then a service-level-agreement determination section (1103) merges updated constrains on the items of the primary service level agreement with stored constraints on the items of the primary service level agreement to determine a new secondary service level agreement. The merging of updated constraints on the items of the primary service level agreement with the stored constraints on the items of the primary service level agreement may indicate, for example, an improvement in throughput, an improvement in service quality, or an addition of a service area, etc.

The improvement in throughput means, for example, that the average throughput defined by the primary service level agreement is improved to a level required by the secondary service level agreement. The improvement in service quality means, for example, that availability defined in the primary service level agreement is improved to a level required by the primary service level agreement. The addition of a service area means, for example, the addition of a service area required by the secondary service level agreement to a service area defined by the primary service level agreement.

A service selecting section (1104) selects a service that satisfies the determined secondary service level agreement from services provided by the primary cloud and the secondary clouds on the basis of an updated preference for service selection. The preference for service selection is stored as a combination of a plurality of constraints and target cost functions.

Specifically, the service selecting section 1104 stores, for example, min($CO_2$ cost) as a target cost function to minimize a $CO_2$ cost. Likewise, the service selecting section (303) may store a target cost function, min(service charge), to minimize service charge. Alternatively, a target cost function, min(management cost), can be used to minimize a management cost.

In addition, a service list that includes information for identifying available information may be stored in the service-list storage section (132) in association with respective service levels. This allows the service selecting section (303) to extract services having a service level that satisfies the newly determined secondary service level agreement by referring to the service list. Since the service list stores information on the details of service that can be provided by the secondary clouds as well as information on the details of service that can be provided by the primary cloud, the service selecting section (303) can select a plurality of available services.

The information on the details of services stored in the service list and provided by the secondary clouds may either be dynamically updated or regularly updated. The items of the service list may also include attributes necessary for defining the secondary service level agreement as well as any target cost functions.

Then, the service selecting section (303) selects, for example, the highest-preference service from the plurality of extracted services on the basis of a preference for service selection in the primary service level agreement stored. The selected service may either be a service that can be provided by the primary cloud or a service that can be provided by the secondary clouds.

A service providing section (1105) provides a selected service. The provision of services includes updating of the primary service level agreement, switching to another service according to the secondary service level agreement, and adding or removing a service according to the secondary service level agreement. This allows the service providing section (1105) to provide a service that satisfies a new secondary service level agreement. This new secondary service level agreement is determined on the basis of updated constraints on the items of the primary service level agreement while maintaining a service level required by the primary service level agreement.

Figure 13:
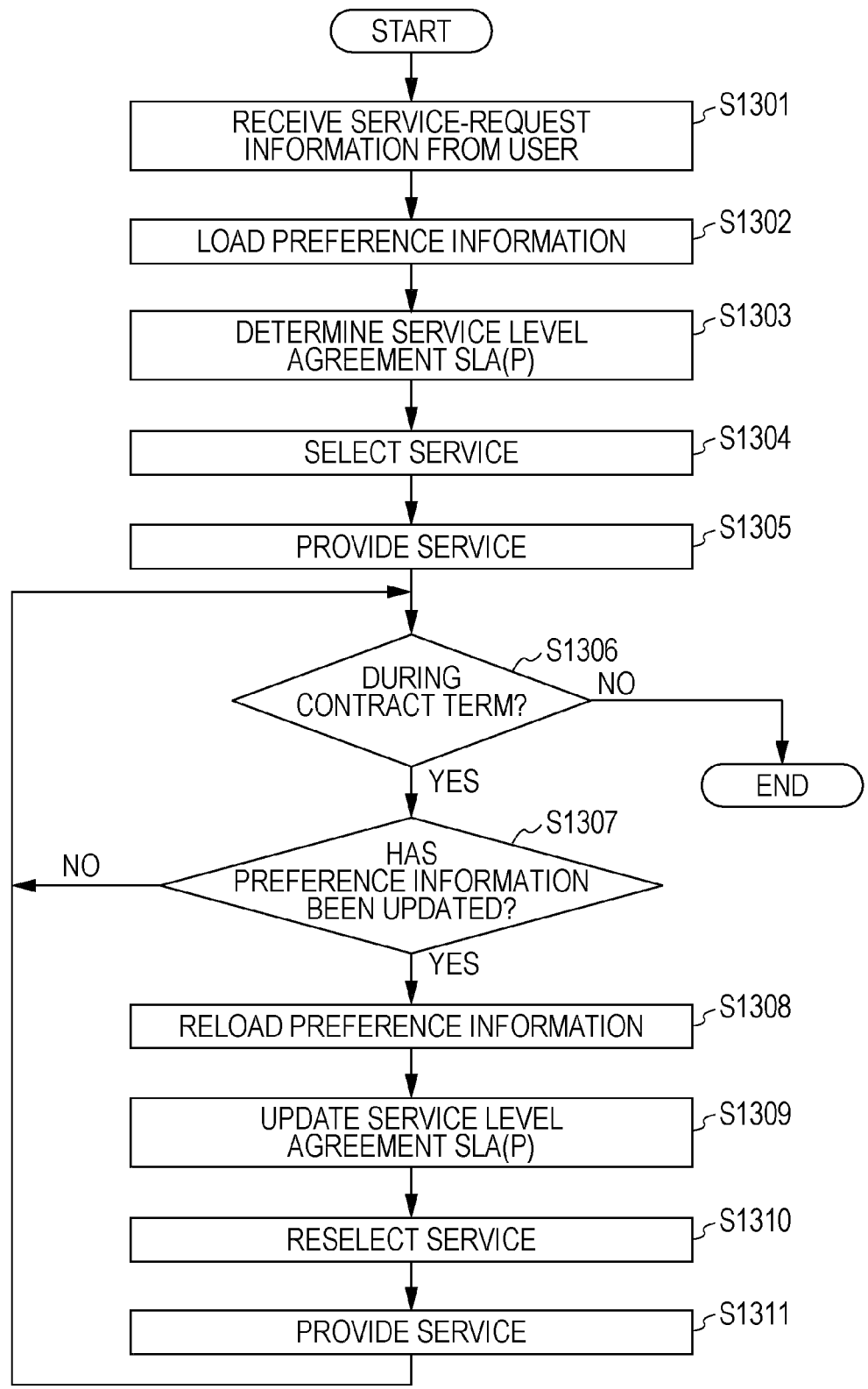
FIG. 13 is a flowchart showing an illustrative procedure performed by the CPU of a primary cloud server, according to one example of principles described herein.

FIG. 13 is a flowchart illustrating the procedure of the CPU of the primary cloud server. The CPU receives (step S1301) service-request information from the user client 3. Specifically, the CPU receives service-request information including information on the details of the primary service level agreement that is to be made between the user and the primary cloud.

The flow of the process will be described below using an example in which the CPU has received, as service-request information, a service with the type, "data analysis", the period of service, "from Apr. 1, 2008 to Aug. 31, 2009", and the performance is 7,000,000 processes or more per week, and availability is 99.99% or more.

The CPU loads (step S1302) preference information stored in the preference-information storage section and determines (step S1303) a new secondary service level agreement separately from the primary service level agreement. The CPU determines the secondary service level agreement by merging constraints on the respective items of the primary service level agreement with the loaded preference information.

For example, if preference information stored in the preference-information storage section is such that constraints on the items of the primary service level agreement are "higher than middle level" in security and a preference for service selection is "minimum" in management cost, then the CPU merges the primary service level agreement included in the service-request information with the constraints on the items of the primary service level agreement included in the preference information together to determine a new secondary service level agreement. In this new secondary service level agreement, the performance is 7,000,000 processes or more per week, availability is 99.99% or more, and security is "higher than middle level."

The CPU selects (step S1304) a service that satisfies the determined secondary service level agreement and provides (step S1305) that service. This allows a service based on the stored preference information to be provided.

FIG. 14 is a diagram of an example of a data structure stored in the service-list storage section of the primary cloud server. The service-list storage section stores a list of information necessary for selecting service, such as the kind of service, service charge, availability, performance, a management cost, as well as whether the service is available, a $CO_2$ cost, and security level, in association with service IDs for identifying the service.

In this second example, the secondary service level agreement is determined such that performance is "7,000,000 processes or more per week", availability is 99.99% or more, and security is "higher than middle level", all of which are satisfied only by service ID 3 of the primary cloud.

Referring back to FIG. 13, the CPU determines (step S1306) if the present time period is during the term of the primary service level agreement made with the user. If the CPU determines that it is (step S1306, YES) during the term of the contract, then the CPU determines (step S1307) whether the preference information has been updated. If the CPU determines that the preference information has indeed (step S1307, YES) been updated, then the CPU reloads (step S1308) the updated preference information and updates (step S1309) the secondary service level agreement. The secondary service level agreement is updated by merging the constraints on the items of the primary service level agreement with the reloaded preference information.

In this example, the preference information stored in the preference-information storage section is updated every day. The constraints on the items of the primary service level agreement are updated to "middle level or higher" in security and to less than $500 in process fees per day in service charges. The preference for service selection is updated to a "minimum" $CO_2$ cost. In this case, the performance, 7,000,000 processes per week or more in the secondary service level agreement is converted to 1,000,000 processes or more per day. The primary service level agreement and the constraints on the items of the primary service level agreement are then merged together again. Thus, the secondary service level agreement is updated to 1,000,000 processes or more per day in performance, 99.99% or higher in availability, "middle level or higher" in security, and less than $500 in process fees per day in service charges.

The CPU reselects (step S1310) a service that satisfies the updated secondary service level agreement and provides (step S1311) that service. Thus, a service that reflects the updated reference information can be provided. If the CPU determines (step S1307, NO) that the preference information has not been updated, then the CPU returns the process to step S1306 and repeats the processes described above. If the CPU determines (step S1306, NO) that the contract term has expired, then the CPU terminates the process.

In this example, constraints on the items of the updated secondary service level agreement are such that performance is 1,000,000 processes per day or more, availability is 99.99% or higher, and security is "middle level or higher", all of which are satisfied by two services: the service with service ID 3 of the primary cloud and the service with service ID A2 of the secondary cloud. Because a service with a "minimum" $CO_2$ cost is given a preference for service selection, the service ID A2 of the secondary cloud whose $CO_2$ cost is low is selected.

A secondary service level agreement different from the primary service level agreement between the primary cloud and the user can be determined based on whether constraints on the items of the primary service level agreement and a preference for service selection have been updated. In addition, the secondary service level agreement may be based on a second service having updated constraints. A preference for service selection can also be dynamically selected and provided for the secondary cloud every time the constraints and/or preference for service selection are updated.

The present invention is not limited to the examples and embodiments described above. For example, the cloud control unit (e.g. 2, FIG. 1) does not have to be integrated with the primary cloud server and may be connected to the primary cloud server as a separate computer so as to transmit and receive data thereto and from. The present invention can be applied to all cloud services, such as a platform distribution service, services provided by a private cloud, a user management service, a data distribution service, an application-developing-environment distribution service, a security service, and a database service.

The flowchart and block diagrams in the Figures illustrate the architecture, functionality, and operation of possible implementations of systems, methods and computer program products according to various embodiments of the present invention. In this regard, each block in the flowchart or block diagrams may represent a section, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for dynamically updating a secondary service level agreement, the method performed by a primary computing server, wherein said primary computing server fulfills a primary service level agreement with a user by supplying service to the user with at least one secondary computing server, said secondary service level agreement existing dynamically between said primary computing server and said at least one secondary computing server, the method comprising:
   with said primary computing server, acquiring an actual usage level of a first service provided to said user, with said at least one secondary computing server, during a predetermined time period in accordance with said primary service level agreement; and
   with said primary computing server, dynamically modifying said secondary service level agreement with said at least one secondary computing server based on said actual usage level acquired during said predetermined time period.

2. The method of claim 1, further comprising, with said primary computing server, storing a preference stated by said user in connection with said primary service level agreement, wherein modifying said secondary service level agreement is performed in accordance with said preference.

3. The method of claim 2, wherein said preference is one of: a limitation on fees charged, and a limitation on power consumed.

4. The method of claim 1, further comprising:
acquiring said actual usage level of the first service provided during said predetermined period; and
modifying said secondary service level agreement based on a ratio of said actual usage level to a planned service level set by said primary service level agreement;
wherein a level of service under said secondary service level agreement is increased or reduced such that said an average service level, including said actual usage level, over a period specified by said primary service level agreement will more closely approximate said planned service level set by said primary service level agreement.

5. The method of claim 2, further comprising:
storing preference information comprising constraints on respective items of said primary service level agreement;
determining a new secondary service level agreement by merging updated constraints on said items of said primary service level agreement with stored constraints on said items of said primary service level agreement;
selecting, from services provided by a primary cloud and a secondary cloud, a second service that satisfies said determined new secondary service level agreement on the basis of said preference for service selection in said primary service level agreement.

6. The method of claim 5, further comprising determining whether said stored constraints on said items of said primary service level agreement have been updated.

7. The method of claim 1, further comprising:
storing a service list comprising information for identifying available services in association with service levels;
extracting additional services comprising a service level that satisfies said secondary service level agreement based on said stored service list; and
selecting one of said additional services based on said stored preference for service selection in said primary service level agreement.

8. A cloud computing system comprising:
a processor; and
a memory communicatively coupled to said processor, said processor configured to:
fulfill a primary service level agreement with a user by supplying service to the user with at least one secondary computing server, a secondary service level agreement existing dynamically between said computing system and said at least one secondary computing server;
acquire an actual usage level of a first service provided to a user during a predetermined time period in accordance with said primary service level agreement; and
modify said secondary service level agreement based on said actual usage level acquired during said predetermined time period.

9. The system of claim 8, wherein said processor is further configured to store a preference stated by said user in connection with said primary service level agreement, wherein modifying said secondary service level agreement is performed in accordance with said preference.

10. The system of claim 9, wherein said preference is one of: a limitation on fees charged, and a limitation on power consumed.

11. The cloud system of claim 8, wherein said processor is further configured to:
acquire said actual usage level of the first service provided during said predetermined period; and
modify said secondary service level agreement based on a ratio of said actual usage level to a planned service level set by said primary service level agreement;
wherein a level of service under said secondary service level agreement is increased or reduced such that said an average service level, including said actual usage level, over a period specified by said primary service level agreement will more closely approximate said planned service level set by said primary service level agreement.

12. The cloud system of claim 9, wherein said processor is further configured to:
store preference information comprising constraints on respective items of said primary service level agreement;
determine a new secondary service level agreement by merging updated constraints on said items of said primary service level agreement with stored constraints on said items of said primary service level agreement,
select, from services provided by a primary cloud and a secondary cloud, a second service that satisfies said determined new secondary service level agreement on the basis of said preference for service selection in said primary service level agreement.

13. The system of claim 12, wherein said processor is further configured to determine whether said stored constraints on said items of said primary service level agreement have been updated, wherein said modifying said secondary service level agreement is triggered by an update to said stored constraints.

14. The system of claim 8, wherein said process is further configured to:
store, in said memory, a service list comprising information for identifying available services in association with service levels;
extracts additional services comprising a service level that satisfies said secondary service level agreement based on said stored service list; and
select one of said additional services based on said stored preference for service selection in said primary service level agreement.

15. A computer program product for dynamically updating a secondary service level agreement for use of a cloud computing system, wherein a primary computing server fulfills a primary service level agreement with a user by supplying service to the user with at least one secondary computing server, said secondary service level agreement existing dynamically between said primary computing server and said at least one secondary computing server, said computer program product comprising:
a computer readable storage memory having computer readable code embodied therewith, said computer readable program code comprising:
computer readable program code configured to store a preference for service selection entered by said user;
computer readable program code configured to acquire an actual usage level of a first service provided to said user during a predetermined time period in accordance with said primary service level agreement;
computer readable program code configured to dynamically modify said secondary service level agreement based on said actual usage level acquired during said predetermined time period and said preference for service selection.

16. The computer program product of claim 15, wherein modifying said secondary service level agreement comprises changing which secondary computing server is selected to provide service for said primary computing server to said user.

17. The computer program product of claim 15, further comprising:
computer readable program code configured to acquire said actual usage level of the first service provided during said predetermined period; and
computer readable program code configured to modify said secondary service level agreement based on a ratio of said actual usage level to a planned service level set by said primary service level agreement;
wherein a level of service under said secondary service level agreement is increased or reduced such that said an average service level, including said actual usage level, over a period specified by said primary service level agreement will more closely approximate said planned service level set by said primary service level agreement.

18. The computer program product of claim 15, further comprising:
computer readable program code configured to store preference information comprising constraints on respective items of said primary service level agreement;
computer readable program code configured to determine a new secondary service level agreement by merging updated constraints on said items of said primary service level agreement with stored constraints on said items of primary service level agreement;
computer readable program code configured to select, from services provided by a primary cloud and a secondary cloud, a second service that satisfies a modified secondary service level agreement on the basis of a preference for service selection in said primary service level agreement.

19. The computer program product of claim 18, further comprising computer readable program code configured to determine whether said stored constraints on said items of said primary service level agreement have been updated.

20. The computer program product of claim 15, further comprising:
computer readable program code configured to store a service list comprising information for identifying available services in association with service levels;
computer readable program code configured to extracts additional services comprising a service level that satisfies said secondary service level agreement based on said stored service list; and
computer readable program code configured to select one of said additional services based on a stored preference for service selection in said primary service level agreement.

21. The method of claim 1, wherein modifying said secondary service level agreement comprises changing which secondary computing server is selected to provide service for said primary computing server to said user.

22. The method of claim 2, further comprising:
receiving user input updating said preference; and
in response to receiving said user input updating said preference, modifying said secondary service level agreement in accordance with said updated preference.

* * * * *